No. 728,676. PATENTED MAY 19, 1903.
H. F. CRANDALL.
SHEAF CARRIER.
APPLICATION FILED FEB. 5, 1903.
NO MODEL. 2 SHEETS—SHEET 1.
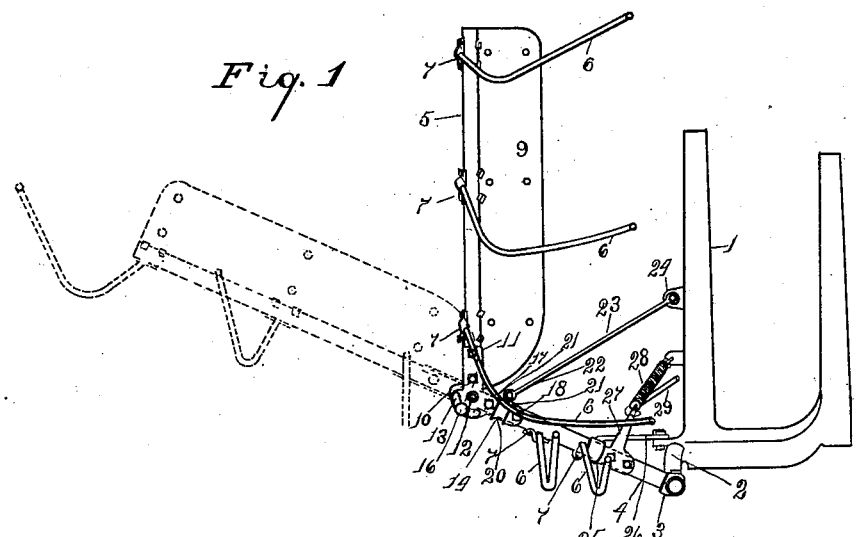
Fig. 1
Fig. 2
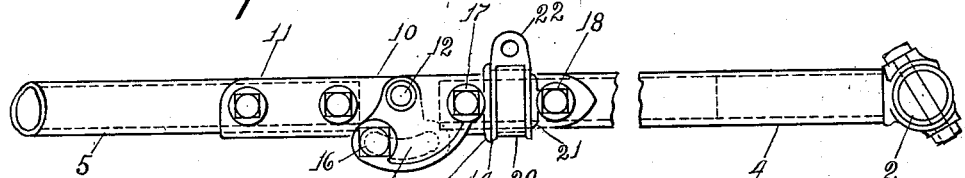
Fig. 3
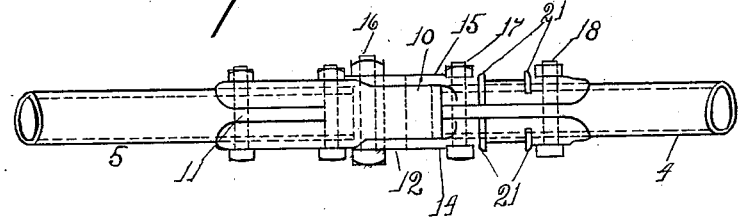
Fig. 4
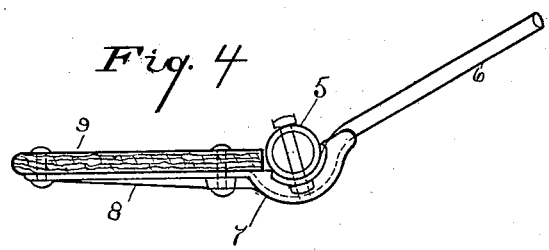
WITNESSES
H. F. Krause
B. C. Wait
INVENTOR
Henry F. Crandall
By his Attorney
E. W. Burgess

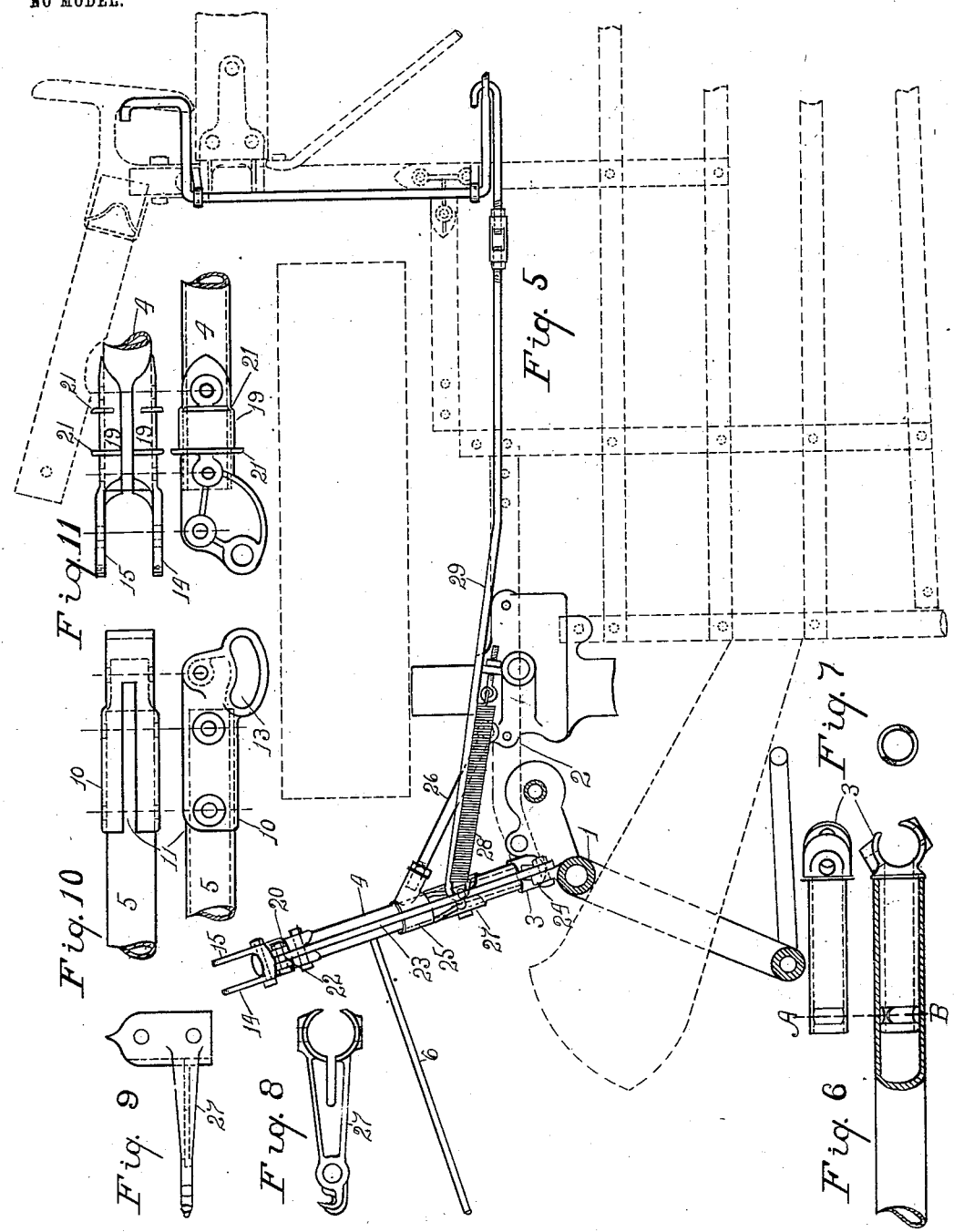

No. 728,676. Patented May 19, 1903.

UNITED STATES PATENT OFFICE.

HENRY F. CRANDALL, OF MILWAUKEE, WISCONSIN, ASSIGNOR TO INTERNATIONAL HARVESTER CO., A CORPORATION OF NEW JERSEY.

SHEAF-CARRIER.

SPECIFICATION forming part of Letters Patent No. 728,676, dated May 19, 1903.

Application filed February 5, 1903. Serial No. 141,983. (No model.)

*To all whom it may concern:*

Be it known that I, HENRY F. CRANDALL, a citizen of the United States, residing at Milwaukee, in the county of Milwaukee and State of Wisconsin, have invented certain new and useful Improvements in Sheaf-Carriers, of which the following is a specification, reference being had to the accompanying drawings, forming a part thereof.

My invention relates to improvements in sheaf-carriers for corn-harvesters, and is particularly adapted to those that are designed to bind the stalks while they are substantially upright; and the objects of my improvement are, first, to provide means whereby the carrier may be partially folded toward an upright position to reduce the width of the machine, and, second, to produce a carrier that will be strong and compact and one that may be easily attached to the harvester proper. I attain these objects by the mechanism illustrated in the accompanying drawings, in which—

Figure 1 is a view of the carrier and so much of a binder attachment as is thought sufficient to illustrate my invention, the full lines representing the carrier in its folded position and the dotted lines the same when in operative position. Fig. 2 is a side view of the joint mechanism. Fig. 3 is a plan view of Fig. 2. Fig. 4 is a detail view of one of the combined finger-clamping pieces and backboard-supports. Fig. 5 is a plan view of the carrier attached to a harvester, the machine being shown in dotted lines. Fig. 6 comprises detail side and end views of the lower section of the finger-supporting bar. Fig. 7 is a section on the line A B of Fig. 6. Figs. 8 and 9 are end and side views of a bracket-arm which is bolted to the finger-supporting bar and has a spring attached to it. Fig. 10 comprises plan and side views of the inner end of the upper portion of the finger-supporting bar, and Fig. 11 comprises corresponding views of the outer end of the lower section of the same bar, these detail views being designed particularly to show the connection of the two parts of the bar.

Like numerals refer to like parts throughout the several views.

1 represents one of the upright arms of a binder-frame; 2, a portion of the wheel-frame to which the binder-frame is secured.

3 is a supporting shank-piece secured to the end of the portion 2, and 4 is the lower section of the finger-supporting bar of the sheaf-carrier, which is pivotally supported by the shank-piece 3.

5 is the upper portion of the finger-supporting bar, and 6 represents the carrier-fingers. The fingers are secured to the supporting-bar by means of the clamping socket-pieces 7. The clamping-pieces 7, that secure the fingers to the outer section 5 of the supporting-bar, are provided with the arm portion 8, to which is secured the backboard 9.

10 is a hinge-piece having the socket 11, which receives the end of the section 5 of the finger-supporting arm, the hinge-pin 12, and the slot 13, concentric with the pin.

14 and 15 are other hinge-pieces that are pivoted on the hinge-piece 12 upon opposite sides of the part 10 and are clamped thereto by means of the bolt 16 passing through the slot 13.

The lower section 4 of the finger-supporting bar is received between the parts 14 and 15, and those parts are secured thereto by means of the bolts 17 and 18. The parts 14 and 15 are provided with shanks, the semicircular sectional bearing portions 19, adapted to form a journal for a ring 20, that is held from endwise movement relative to said parts by the semicollars 21. The ring 20 is provided with the ear 22, and a sustaining-rod 23 is secured to the ear and extends to the arm 1 of the binder-frame and is secured to an ear 24 thereon. Another ring 25, similar in form to 20, is journaled near the lower end of section 4, and a brace 26 is secured thereto and extends forward to a point on the frame, where it is secured. An arm 27 is secured near the lower end of section 4 and forms an abutting shoulder for the ring 25 to prevent it sliding downward on the finger-supporting bar. To the upper end of the arm 27 is attached one end of a sustaining-spring 28, that has its opposite end adjustably connected with the frame of the machine and which is adapted to counterbalance the tendency of the fingers to drop away from an operative position.

A rod 29 connects the upper end of the arm 27 with the usual foot-crank upon the frame of the harvester. Any of the common ways may be used for rocking the finger-supporting bar on its shank.

The operation of the carrier is as follows: It is pivoted on the supporting-shank and sustained in position by means of the braces. It is free to rock in the rings to which the sustaining-braces are attached to discharge its load when the operator releases it by any of the well-known means. In passing through gateways or other narrow openings, in opening a field, or cutting close to fences it is important that means be provided for reducing the width of the machine by raising the carrier from its semiprostrate position to one substantially vertical, and it is also important that means be provided through which it may be sustained at any degree of inclination.

The two sections of the finger-supporting arm being hinge-jointed together, as described, and the hinge being clamped by the bolt 16, all that is necessary to adjust the carrier is to loosen the nut on the clamping-bolt and raise the outer section to the position desired and then secure it in that position by tightening the nut.

What I claim as my invention, and desire to secure by Letters Patent, is—

1. In a sheaf-carrier for corn-harvesters, the combination of carrying-fingers, a finger-supporting bar comprising two sections that are hinge-jointed together, means for pivotally sustaining one section of the bar in a fixed angular position relative to the harvester, and means for holding the other section of the bar at any desired angle with the first-named section.

2. In a sheaf-carrier for corn-harvesters, the combination of carrying-fingers, a finger-supporting bar comprising two sections that are hinge-jointed together, sustaining-braces holding one section of the bar in a fixed angular position relative to the harvester, one end of each brace being secured to portions of the harvester and their opposite ends secured to parts in which the fixed section of the finger-supporting bar is adapted to rock, and means for rocking said bar.

3. In a sheaf-carrier, the combination of carrier-fingers, a finger-supporting bar comprising two sections that are hinge-jointed together, one member of the hinge having a slot concentric with its axis, and the other member being provided with an opening opposite the slot and a bolt that clamps the two members together.

4. In a sheaf-carrier, the combination of carrier-fingers, a finger-supporting bar comprising two sections that are hinge-jointed together, one member of the hinge having a socket to receive one section of the bar, and provided with a slot concentric with the axis of the hinge, and the other member being provided with a socket to receive the other section of said bar, and having wing portions embracing the slotted member, and means for clamping the wing portions against the slotted portion.

5. In a sheaf-carrier, the combination of carrier-fingers, a finger-supporting bar comprising two sections that are hinge-jointed together, one member of the hinge having a socket to receive one section of the bar and provided with a slot concentric with the axis of the hinge, and two plates forming the other member, said plates having sectional shank portions adapted to receive a supporting-ring and embrace the other section of the bar, and means for clamping the plates against the slotted member.

In witness whereof I hereto affix my signature in presence of two witnesses.

HENRY F. CRANDALL.

Witnesses:
B. C. WAIT,
LOUIS O. ZEDLER.